Figure 1:
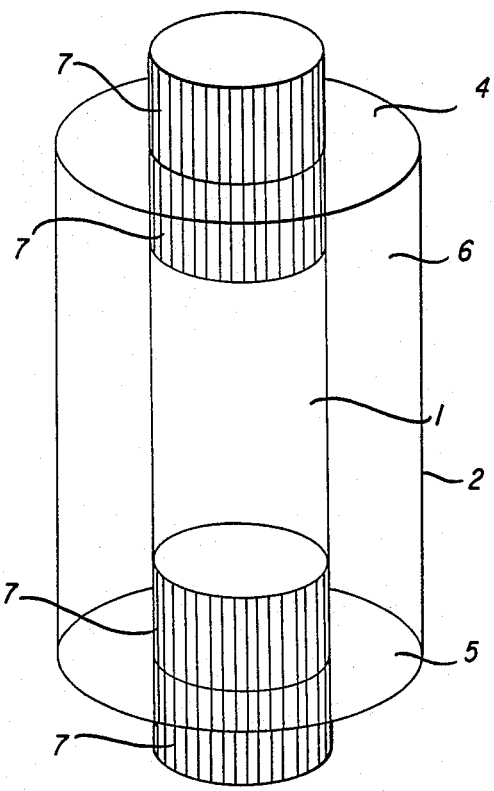

United States Patent [19]

Schulten

[11] Patent Number: 4,830,817

[45] Date of Patent: May 16, 1989

[54] THERMOELECTRIC GENERATOR WITH NUCLEAR HEAT SOURCE

[75] Inventor: Rudolf Schulten, Jülich, Fed. Rep. of Germany

[73] Assignee: Brown, Boveri & Cie AG, Mannheim-Käfertal, Fed. Rep. of Germany

[21] Appl. No.: 113,282

[22] PCT Filed: Dec. 4, 1986

[86] PCT No.: PCT/DE86/00496

§ 371 Date: Aug. 4, 1987

§ 102(e) Date: Aug. 4, 1987

[87] PCT Pub. No.: WO87/03733

PCT Pub. Date: Jun. 18, 1987

[30] Foreign Application Priority Data

Dec. 4, 1985 [DE] Fed. Rep. of Germany ....... 3542839

[51] Int. Cl.$^4$ .............................................. G21C 3/40
[52] U.S. Cl. ..................................... 376/320; 310/303
[58] Field of Search ...................... 310/301, 302, 303; 376/320, 321

[56] References Cited

U.S. PATENT DOCUMENTS

| | | | |
|---|---|---|---|
| 3,005,766 | 10/1961 | Bartnoff | 376/320 |
| 3,117,913 | 1/1964 | Shoupp | 376/320 |
| 3,189,765 | 6/1965 | Danko et al. | 376/321 |
| 3,211,586 | 10/1965 | McCoy et al. | 376/320 |
| 3,282,741 | 11/1966 | Pigford et al. | 376/320 |
| 3,329,532 | 7/1967 | Austin et al. | 310/303 |

OTHER PUBLICATIONS

"Romashka in Perspective", (Sheldon D. Strauss), Nucleonics, vol. 22, No. 12, Dec. 1964, pp. 68–70.

Primary Examiner—Deborah L. Kyle
Assistant Examiner—Richard W. Wendtland
Attorney, Agent, or Firm—Herbert L. Lerner; Laurence A. Greenberg

[57] ABSTRACT

A thermoelectric generator has a cylindrical high temperature reactor as a heat source. A carbon-fiber reinforced graphite lattice structure supports a multiplicity of thermoelectric units which surround and receive heat from the core of the reactor. The reactor core is composed of fuel rods made of graphite in which nuclear fuel particles are embedded. The central portion of the core contains reflector elements. Power regulation is provided by control rods that are insertable into the core in openings among the fuel rods.

10 Claims, 4 Drawing Sheets

THERMOELECTRIC GENERATOR WITH NUCLEAR HEAT SOURCE

The invention relates to a thermoelectric generator having a nuclear heat source as generically defined by the preamble to claim 1. From the information publication "Nucleonics", 22, Dec. 1964, a generator by the name of "Romashka" is known, in which the nuclear heat source is embodied by a cylindrical reactor. The core of the reactor contains ceramic material. The generator also has a cylindrical support for thermoelectric units that surrounds the reactor from which it is spaced apart by a defined distance. The transfer of heat from the reactor to the support and the dissipation of lost heat from the support takes place by thermal radiation directed radially outward.

It is the object of the invention to improve this known apparatus such that exact regulation of the reactor is possible, and the weight of the support becomes lighter.

The attainment of this object is disclosed in claim 1.

The high temperature reactor, which is entirely of ceramic materials, has a very high temperature at its surface and as a result can furnish sufficient output, in the form of thermal radiation, to the outside. The cylindrical shield having the thermoelectric units absorbs the heat radiated by the high temperature reactor, converts part of it into electrical current, and radiates the lost heat to the outside.

For generating sufficient current, the outside temperature of the shield must be approximately on the order of magnitude of 700–900K. The temperature difference from the inside to the outside of the shield must amount to approximately 400–600K. A sufficiently great thermal transport from the surface of the high temperature reactor to the inside of the shield requires temperatures on the order of magnitude of 1400–1600K. By present knowledge, 1400K must be set as the highest material temperature in the shield. For this internal shield temperature, the resultant temperature for the surface of the reactor is 1730K. In the interior of the reactor, calculated with known thermal transport data, temperatures of approximately 2400K are to assumed. Such high temperatures require that all the components of the reactor be manufactured from ceramic materials.

Radiation damage to the thermoelectric units and to the thermal insulating means by fast neutrons occurs to only a very limited extent, because the nuclear heat source is a thermal nuclear reactor. As a rough estimate shows, the fast neutron dose in the shield is so low that carbon-fiber-reinforced graphite can be used without reservation as the shield material.

A greater output of the thermoelectric generator than that sought can also be attained by increasing the surface area of the shield. Taking all the parameters of the height of the temperature and the possibilities of development of thermoelectric generators into account, even an output increase from 200kW$_{el}$ to approximately 1000 kW$_{el}$ appears to be possible, without having to increase the size of the overall apparatus substantially.

Advantageous further embodiments of the invention are disclosed in the dependent claims as well as in the ensuing description of an exemplary embodiment, taken in conjunction with the schematic drawings.

Figure 2:
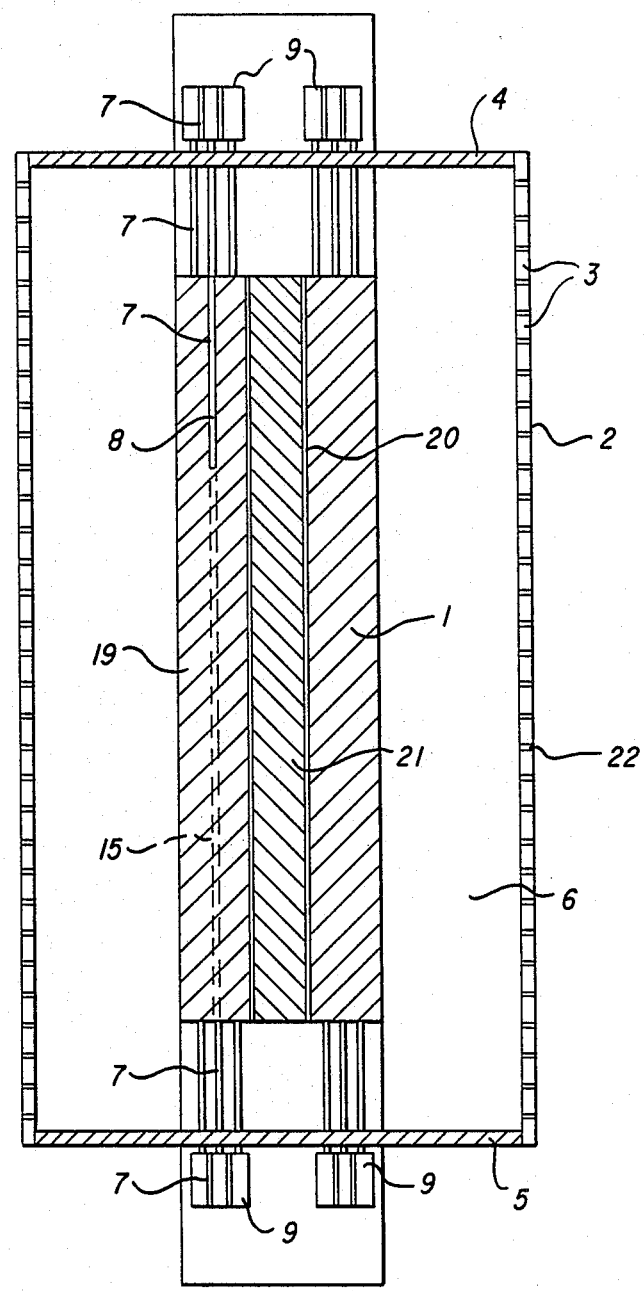
Figures 3, 4, 5:
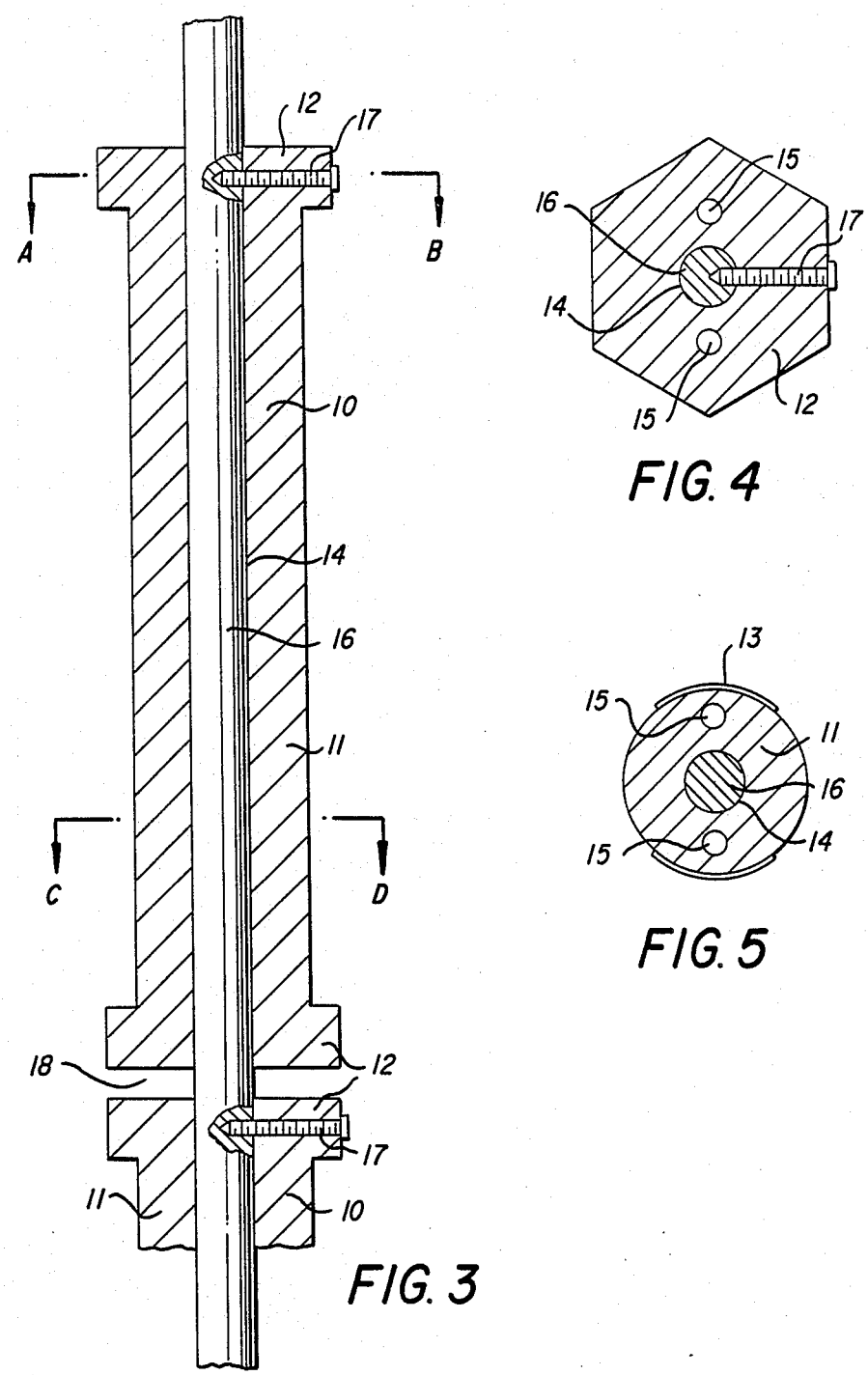
Figure 6:
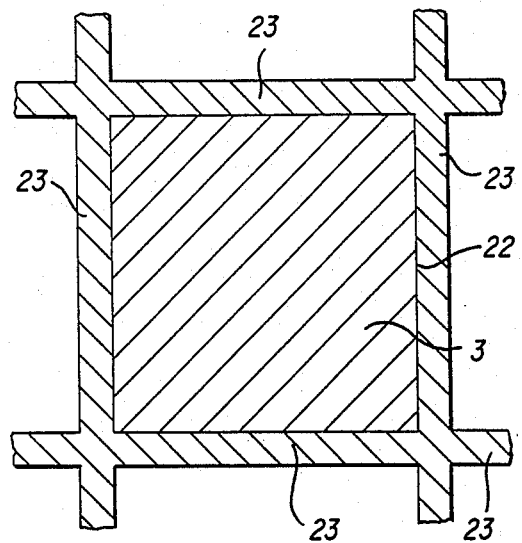
Figure 7:
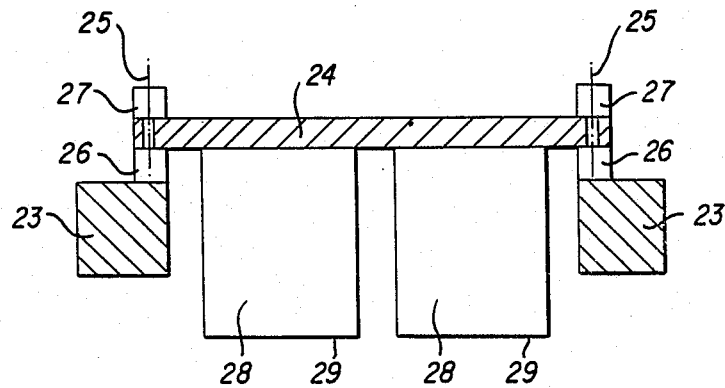

The figures individually show the following:

FIG. 1, a perspective illustration of the thermoelectric generator according to the invention;

FIG. 2, a longitudinal section through this generator;

FIG. 3, a longitudinal section through a single fuel element;

FIG. 4, a section taken along the line A—B of FIG. 3;

FIG. 5, a section taken along the line C—D of FIG. 3;

FIG. 6, a detail of the shield along with the thermoelectric units, greatly enlarged; and FIG. 7, the fastening of a thermoelectric unit to the shield.

FIGS. 1 and 2 show a thermoelectric generator, which substantially has a cylindrical thermal high temperature reactor 1, a likewise cylindrical shield 2 made of carbon-fiber-reinforced graphite as the support for a multiplicity of thermo-electric units 3, and two plates 4 and 5 of thermally insulating material. The high temperature reactor, which has an output of 3 MW$_{th}$, is disposed in the center of the shield 2, which surrounds it with clearance. The shield 2 is embodied as a lattice-like scaffold construction, as will be explained hereinafter. The two plates 4 and 5 which are provided on the end faces of the high temperature reactor 1 comprise magnesium oxide and carbon-fiber-reinforced graphite, which serves as the support material. They also cover the annular space 6 between the high temperature reactor 1 and the shield 2.

For regulating and shutting off the high temperature reactor 1, two regulating and shutoff devices 7 are provided, which are likewise disposed on the end faces of the high temperature reactor 1. Each regulating and shutoff device 7 includes a number of absorber rods 8 and the associated drive means 9. The absorber rods 8 can be introduced into the core and retracted again from the end faces of the high temperature reactor 1. They comprise carbon-fiber-reinforced graphite, to which boron is added as a neutron absorber. In the example given here, approximately 20 absorber rods are required in order to switch the high temperature reactor 1 on and off; only one of the absorber rods is shown in FIG. 2.

In order to keep friction between the absorber rods 8 and the core as low as possible, the end face surfaces as well as the surfaces contacted by the absorber rods 8 are provided with a surface coating of titanium carbide. The drive means 9 of the absorber rods 8 are located above and below the high temperature reactor 1, specifically outside the plates 4 and 5, so that they are protected from the high temperatures of the high temperature reactor 1. Serving as the driving force for the introduction and retraction of the absorber rods 8 in each case is an electric motor, which via a rack and a pinion enables a reciprocating motion of the absorber rods 8 by approximately 4 m.

Aside from the two regulation and shutoff devices 7, there are no moving parts at all in the high temperature reactor 1, and so the entire assembly has long-term high reliability. It is also advantageous that the devices 7 are located on the end faces of the high temperature reactor 1, because as a result of this arrangement the entire jacket face of the shield 2 can be utilized for heat transfer.

The high temperature reactor 1 has different fuel concentrations over its cross section as well as in the axial direction; on the lateral surface as well as on the top and bottom surfaces of the core, the fuel concentration is higher by approximately 50-100% than would correspond to the mean fuel concentration. This compensates for the flattening of the output that would otherwise occur. By means of this selection of concentration, the neutron flux is affected relatively little; the distribution of output, contrarily, can be thereby adjusted to an accuracy of approximately ±30% deviation from the mean value.

The core of the high temperature reactor comprises a number of rod-like fuel elements 10, one of which is shown in FIGS. 3, 4 and 5. As the material for the fuel elements 10, carbon-fiber-reinforced graphite is used, in which ziconium-carbide-coated fuel particles of uranium oxide are embedded. Zirconium carbide has a sufficiently high melting point of approximately 3500° C. At the low neutron dose required here and at an assumed time in service of approximately 10 years, adequate stability of the cladded fuel particles can be expected. The fuel elements 10 have a cylindrical cross section over the majority 11 of the length; mounted on this portion 11 at the top and bottom is an end piece 12 having a hexagonal cross section. The end pieces 12 are larger than the cylindrical portion 11, so that between the fuel elements 10 that are located closely together, free interspaces are present for the propagation of the thermal radiation. To improve the heat transport from the interior of a core to the outside, the fuel elements 10 have a vapor-deposited coating 13 of silicon carbide on a portion of their jacket, as FIG. 5 shows. The effect of the vapor-deposited coating 13 is that a greater proportion of the thermal radiation passes through the free interspaces to reach the outside.

Each fuel element 10 has a central axial bore 14 as well as two further axial openings 15 for the introduction of two absorber rods 8. A support rod 16, which is made of a material having a very low thermal expansion, preferably carbon-fiber-reinforced graphite, is disposed in the bore 14. In the upper end piece 12 of each fuel element 10, a clamping screw 17, likewise made of carbon-fiber-reinforced graphite, is provided, which serves for fixation of the fuel element on the support rod 16. A plurality of fuel elements 10 are arranged among one another on one support rod 16, as can be seen from FIG. 3. One expansion gap 18 is left open between each two fuel elements 10. Further expansion gaps are also present between adjacent fuel elements 10. Close tolerances can be adhered to between the support rods 16 and the bores 14 in the fuel elememts 10, these tolerances merely accommodating the expansion of the fuel elements 10 and their slight shrinkages during the period in service. The same is true for the clamping screws 17. The support rods 16 can be produced in such a way that their expansion upon temperature elevation is practically negligible.

As FIG. 2 shows, the core of the high temperature reactor 1 is designed such that the active core zone 19 has an annular cross section; that is, the central zone of the core remains free of fuel elements 10 and thus has no output, in order to avoid an overly great temperature rise inside the high temperature reactor 1. In a reactor of this kind having an annular core, the maximum temperature in the interior of the core is 2300K. In the central hollow space 20, reflector elements 21 are provided, which has the same shape as the fuel elements 10. In the reflector elements 21, and additionally in the fuel elements 10 as well, burnable neutron poisons are provided.

As already mentioned, the shield 2, which serves as the support for the thermoelectric units 3, is embodied as a latticelike scaffold construction. This will be explained in further detail referring to FIGS. 6 and 7.

FIG. 6 shows one of the square lattice spaces 22 of the scaffold construction, which is framed by struts 23. The struts 23 are of carbon-fiber-reinforced graphite. One of the thermoelectric units 3 is inserted into each space 22. In the thermoelectric units 3, semiconductors 28 of silicon-germanium crystals with high p- and n-doping are used, which are attached to a metal plate 24. The metal plates 24 each serve as the heat exchanger, located on the hot side, of the associated thermoelectric unit. The metal plates 24 must be electrically insulated from the scaffold construction of the shield 2. To this end, the type of fastening shown in FIG. 7 is provided for the fixation of the metal plates 24 in the lattice spaces 22. Serving as fastening means are screws 25, which are disposed such that shaped ceramic pieces 26 are located between the metal plates 24 and the lattice struts 23. The screws 25, which are guided without contact through the metal plates 24, are braced against further shaped ceramic pieces 27. The shaped pieces are preferably of magnesium oxide or aluminum oxide.

As FIG. 7 shows, metal plates 29, which serve to pick up voltage from the thermoelectric unit 3, are soldered to the lower end of the semiconductors 28. The pickup of voltage makes an electrical series circuit and a thermal parallel circuit possible, so that high reliability can be attained following a process of optimization. For the metal structural parts of the thermoelectric units 3, highly heat resistant materials such as tungsten or niobium are used.

The high temperature reactor 1 described can be operated in accordance with two conceptions: in long-term operation, or for temporary use with a short run-in phase. For long-term operation, which necessitates careful design with burnable neutron poisons, the amount of nuclear fuel increases, and in a reactor having an output of 3 $MW_{th}$ is on the order of magnitude of 100 kg of nuclear fuel. The absorber rods 8 in this case serve only to switch the reactor on by their retraction, and to shut it back off again by their insertion after operation has ended. Because of the high temperature coefficient of the reactor and the relative insensitivity of the overall system to temperature fluctuations, with this mode of operation an approximately equal output can be attained for a relatively long period of time by means of the burnable neutron poisons, making regulation with the absorber rods 8 unnecessary.

Contrarily, when the high temperature reactor 1 is used in the temporary mode, the retraction of the absorber rods 8 must be performed within a time period of 10–100 seconds at a time. The resultant temperature increase is tolerated well by the core of the high temperature reactor 1, because the expansion must substantially be absorbed by the support rods 16 of carbon-fiber-reinforced graphite, and this material exhibits virtually no expansion. In the temporary operation mode, the charge of nuclear fuel is smaller and is on the order of magnitude of 80 kg. In this case the activation of the overall system is practically negligible. It is also advantageous that only a little burnable neutron poison is needed.

For a high temperature reactor having a thermal output of 3 $MW_{th}$, an electrical output of 200 $kW_e$ is attained—assuming an electrical efficiency of 0.06. The volume of the core is approximately 25 m$^3$, given a reactor radius of 1 m and a height of 8 m. For the radius of the shields 2, 1.8 m is assumed, and for its height, 10 m. The thermal neutron flux in the core of the reactor 1 amounts to $10^{13}$ n/cm$^2$ s, while that in the core is $4 \times 10^{11}$ n/cm s [sic].

I claim:

1. A thermoelectric generator having a cylindrical high temperature reactor (1) as a heat source, the core of which is of ceramic material, the heat source being defined at top and bottom by plates (4, 5) and being surrounded with clearance by a cylindrical support (2), on which a multiplicity of thermoelectric units are disposed, and the heat transfer from the high temperature reactor (1) to the support (2) as well as the dissipation of the lost heat from the support (2) being effected by means of radially outwardly directed thermal radiation, wherein the improvement comprising the cylindrical support (2) is embodied as a shield in the form of a scaffold construction of carbon-fiber-reinforced graphite, which has square lattice spaces for receiving the thermoelectric units, that the core of the high temperature reactor (1) is embodied by rod-like fuel elements (10) of graphite, in which coated fuel particles are embedded, that by means of the particular shaping and disposition of the fuel elements (10) in the core a central hollow space (20) is embodied for receiving reflector elements (21), and that one regulating and shutoff device (7) each is provided on both end faces of the high temperature reactor (1), which device has absorber rods that are insertable into the core and are moveable in openings (15) of the fuel elements (10).

2. A thermoelectric generator as defined by claim 1, wherein part of the surface of the fuel elements (10) has a vapor-deposited coating (13) of silicon carbide.

3. A thermoelectric generator as defined by claim 1, wherein the active core zone (19) has an annular cross section.

4. A thermoelectric generator as defined by claim 1, wherein the reflector elements (21) have the same shape as the fuel elements (10).

5. A thermoelectric generator as defined by claim 4 wherein the core of the high temperature reactor (1) has burnable neutron poisons, which are disposed in the fuel elements (10) and/or in the reflector elements (21).

6. A thermoelectric generator as defined by claim 1, wherein the heat exchanger, embodied by a metal plate, is secured on the scaffold construction (2) on the hot side of each thermoelectric unit (3) with the aid of screws (25).

7. A thermoelectric generator as defined by one of the claims 1 or 2, wherein the rod-like fuel elements (10) substantially have a circular cross section and have an upper and lower end piece (12) of hexagonal cross section, that each fuel element (10 has a continuous central axial bore (14), in which a support rod (16) of a material having a very low thermal expansion, preferably of carbon-fiber-reinforced graphite, is disposed, that each fuel element (10) is fixed on the support rod (16) by means of clamping screws (17), preferably of carbon-fiber-reinforced graphite, which are provided in the upper end piece (12), and that a plurality of fuel elements (10) are disposed, spaced apart from one another, on one support rod (16).

8. A thermoelectric generator as defined by claim 1, wherein the fuel concentration in the fuel elements (10) is fixed in such a way that a relatively uniform output is established axially and radially over the core of the high temperature reactor (1), the deviation of which from the mean value amounts to no more than approximately ±30%, that on the side surface as well as on the top and bottom surface of the core the fuel concentration is selected to be higher by approximately 50-100% than would correspond to the mean fuel concentration.

9. A thermoelectric generator as defined by claim 1, wherein the two plates (4, 5) of thermally insulating material on the two end faces of the high temperature reactor (1) also cover the annular space (6) between the high temperature reactor (1) and the shield (2), and that the two plates (4, 5) comprise carbon-fiber-reinforced graphite, as the support material, and magnesium oxide.

10. A thermoelectric generator as defined by claim 1, wherein the drive devices (9) for the absorber rods (8) are disposed outside the plates (4, 5) of thermally insulating material, that the absorber rods (8) comprise carbon-fiber-reinforced graphite having a defined boron content, and that the absorber rods (8) as well as all the parts the surfaces of which are contacted by the absorber rods (8) have a ceramic surface coating, which comprises a titanium carbide coating.

* * * * *